US012773369B2

(12) United States Patent
Thoppey et al.

(10) Patent No.: US 12,773,369 B2
(45) Date of Patent: Oct. 27, 2026

(54) ACTIVE COMPRESSION DEVICE AND PRESSURE UNIT

(71) Applicant: Essity Hygiene and Health Aktiebolag, Gothenburg (SE)

(72) Inventors: Nagarajan Muthuraman Thoppey, Hamburg (DE); Geoffrey Spinks, Wollongong (AU); Christopher Richards, Wollongong (AU); Kevin M. Tucker, Hickory, NC (US)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 716 days.

(21) Appl. No.: 18/256,811

(22) PCT Filed: Dec. 16, 2021

(86) PCT No.: PCT/EP2021/086169
§ 371 (c)(1),
(2) Date: Jun. 9, 2023

(87) PCT Pub. No.: WO2022/129321
PCT Pub. Date: Jun. 23, 2022

(65) Prior Publication Data

US 2024/0016692 A1 Jan. 18, 2024
US 2025/0295550 A2 Sep. 25, 2025

(30) Foreign Application Priority Data

Dec. 16, 2020 (EP) .................................... 20214674

(51) Int. Cl.
*A61H 7/00* (2006.01)
*A61H 1/00* (2006.01)
(Continued)

(52) U.S. Cl.
CPC ........... *A61H 9/0092* (2013.01); *A61H 1/006* (2013.01); *A61H 7/001* (2013.01); *A61H 11/00* (2013.01);
(Continued)

(58) Field of Classification Search
CPC ........... A61H 1/006–008; A61H 7/001; A61H 7/007; A61H 11/00–02; A61H 23/00;
(Continued)

(56) References Cited

U.S. PATENT DOCUMENTS 7,857,777 B2 * 12/2010 Larson ..................... A61H 7/00 602/61
7,896,825 B2 * 3/2011 Atkinson ............. A61H 9/0078 601/151
(Continued)

FOREIGN PATENT DOCUMENTS

CN 105997461 B 1/2018
CN 105997485 B 3/2018
(Continued)

OTHER PUBLICATIONS

Columbian Office Action, Application No. PCT/EP2021/086169, mailed Nov. 14, 2026; with English Translation, 23 pages.
(Continued)

*Primary Examiner* — Tu A Vo
(74) *Attorney, Agent, or Firm* — CANTOR COLBURN LLP

(57) ABSTRACT

A wearable device for applying pressure to a body part of a subject includes a plurality of pressure units. Each pressure unit of the pressure units includes a support structure, and a movable structure movably supported by the support structure and having three translational degrees of freedom relative to the support structure. Each pressure unit of the pressure units is connected or connectable to a controller
(Continued)

configured to control a movement of the movable structure relative to the support structure.

21 Claims, 6 Drawing Sheets

(51) Int. Cl.
*A61H 9/00* (2006.01)
*A61H 11/00* (2006.01)

(52) U.S. Cl.
CPC .................. *A61H 2011/005* (2013.01); *A61H 2201/1207* (2013.01); *A61H 2201/1635* (2013.01); *A61H 2201/164* (2013.01); *A61H 2201/1647* (2013.01); *A61H 2201/165* (2013.01); *A61H 2201/1654* (2013.01); *A61H 2201/1664* (2013.01); *A61H 2201/1666* (2013.01); *A61H 2201/5005* (2013.01); *A61H 2201/5007* (2013.01); *A61H 2201/5071* (2013.01); *A61H 2201/5082* (2013.01); *A61H 2230/00* (2013.01)

(58) Field of Classification Search
CPC ...... A61H 23/02–0236; A61H 2201/02; A61H 2201/0207; A61H 2201/0214; A61H 2201/5007; A61H 2205/106; A61H 2205/12; A61H 2209/00; A61H 2230/00; A61H 2201/5082; A61H 2201/5071; A61H 2201/5005; A61H 2201/1666; A61H 2201/1664; A61H 2201/1654; A61H 2201/165; A61H 2201/1647; A61H 2201/164; A61H 2201/1635; A61H 2201/1207; A61H 2011/005; A61F 13/08–085
See application file for complete search history.

(56) References Cited

U.S. PATENT DOCUMENTS

| | | | | |
|---|---|---|---|---|
| 8,764,689 | B2 | 7/2014 | Toth | |
| 9,161,878 | B1 * | 10/2015 | Pamplin | A61H 7/001 |
| 9,326,911 | B2 * | 5/2016 | Wyatt | A61H 9/0007 |
| 10,617,593 | B2 * | 4/2020 | Wyatt | A61H 11/00 |
| 11,672,729 | B2 * | 6/2023 | Pamplin | A61H 11/00 601/84 |
| 11,707,405 | B2 * | 7/2023 | Pamplin | F03G 7/0614 601/46 |
| 2003/0212303 | A1 | 11/2003 | Kahn | |
| 2007/0084220 | A1 * | 4/2007 | Asada | B60N 2/5678 62/3.61 |
| 2009/0036212 | A1 * | 2/2009 | Provancher | G06F 3/016 463/30 |
| 2010/0204803 | A1 * | 8/2010 | Tozzi | A61F 2/0036 623/23.72 |
| 2010/0234779 | A1 * | 9/2010 | Asvadi | A61H 1/008 601/84 |
| 2012/0232447 | A1 * | 9/2012 | Gordon | A61H 9/0092 601/151 |
| 2013/0116852 | A1 | 5/2013 | Dijk et al. | |
| 2013/0303957 | A1 * | 11/2013 | Bauerfeind | A61H 1/008 602/76 |
| 2015/0073318 | A1 * | 3/2015 | Holschuh | A61F 13/08 601/84 |
| 2015/0073319 | A1 * | 3/2015 | Holschuh | B64G 6/00 601/84 |
| 2016/0022528 | A1 * | 1/2016 | Wyatt | A61H 1/008 601/152 |
| 2016/0058644 | A1 * | 3/2016 | Cheatham, III | A61B 5/4836 601/84 |
| 2017/0304139 | A1 * | 10/2017 | Ross | A61H 11/00 |
| 2018/0177677 | A1 * | 6/2018 | Pamplin | A61H 7/007 |
| 2018/0338692 | A1 | 11/2018 | Robinson et al. | |
| 2018/0348593 | A1 * | 12/2018 | Brown | G03B 3/10 |
| 2020/0170873 | A1 | 6/2020 | Walsh et al. | |
| 2021/0386614 | A1 * | 12/2021 | Doraiswamy | A61H 9/0092 |

FOREIGN PATENT DOCUMENTS

| | | | | |
|---|---|---|---|---|
| DE | 4304091 A1 | | 8/1994 | |
| JP | 2005133553 A | * | 5/2005 | |
| JP | 2005304960 A | | 11/2005 | |
| WO | 2009004092 A1 | | 1/2009 | |
| WO | 2010103243 A1 | | 9/2010 | |
| WO | WO-2020144437 A1 | * | 7/2020 | A61H 11/00 |

OTHER PUBLICATIONS

European Application No. 20214674.2-1122; Communication pursuant to Article 94(3) EPC dated Jun. 4, 2024; 8 pages.
International Search Report & Written Opinion for International Application No. PCT/EP2021/086169; International Filing Date: Dec. 16, 2021; Date of Mailing: Mar. 31, 2022; 12 pages.
European Application No. 21835774.7-1122; Office Action dated May 13, 2025; 5 pages.

* cited by examiner

ACTIVE COMPRESSION DEVICE AND PRESSURE UNIT

CROSS REFERENCE TO RELATED APPLICATIONS

This application is a National Stage application of PCT/EP2021/086169, filed Dec. 16, 2021, which claims priority to European Application No. 20214674.2, filed Dec. 16, 2020, both of which are incorporated by reference in their entirety herein.

TECHNICAL FIELD

The present disclosure relates to a wearable device, preferably a garment, such as a sleeve or stocking, for applying pressure to a body part of a subject, in particular for providing compression therapy, wherein the device comprises one or more pressure units.

BACKGROUND

Garments which are able to apply pressure to a body part of a subject are known as compression garments and have been used for a variety of therapeutic and non-therapeutic applications, such as treating lymphedema, enhancing athletic performance or for cosmetic purposes. Most of the garments known to date provide a constant level of compression to the body part on which they are worn. These garments are typically formed of tight fitting passive elastic materials.

To be able to modify the level of compression, active compression garments have been proposed as an alternative. These can be used to massage the respective body part and, thereby, shorten recovery times for athletes or enhance the backflow of bodily fluids from the body part in certain medical conditions, such as lymphedema. Moreover, active compression garments could be used by the manual massage therapists as a tool for their patients to augment their treatment in between therapy sessions. The active garments allow the treated subject to initiate a massage session in the absence of the massage therapist.

Massage therapy is needed for example in patients having a compromised lymphatic system who developed a lymphedema. The condition is often characterized by a localized swelling of one or more limbs that is caused by an abnormal accumulation of tissue proteins, edema and chronic inflammation. Specialized treatments for lymphedema include, in particular in the early stages of treatment, manual lymphatic drainage (MLD). During MLD, the massage therapist aims at reducing the amount of fluid in the limb through a specialized massage technique particularly designed for the condition.

Active compression garments that have been proposed in the past are, however, unable to mimic the complex massage techniques that are used during MLD. Examples of such active compression garments include e.g. garments that comprise pneumatically-pressurized bladders and garments which make use of bands that comprise shape memory materials and contract around the respective limbs. While these can exert pressure on larger parts of a limb, the resulting massaging effect does not resemble the MLD massage carried out by a massage therapist during a manual lymph drainage. For example, the garments are unable to mimic the fine stroking movements of a massage therapist, carry out a localized treatment in a particular subregions of a limb or vary massage pressure or location during the massage.

There is, thus, a need in the art for wearable, active compression devices which allow the automated massage of a body part and at the same time are able to mimic the specific small-scale movements and pressure variations that a human massage therapist would apply.

SUMMARY

This problem is solved by the wearable compression device and pressure units as described in the appended claims.

The present invention makes use of a plurality of distinct pressure units each of which comprises a movable member that can exert a pressure on the tissue that is quite similar to the pressure exerted by the fingers of a massage therapist. The movable member can not only be moved in the direction of the tissue and away from it (z-directions)—i.e. orthogonal with respect to the surface of the treated body part—but also in x- and y-directions parallel to the surface of the body part to be treated. Moreover, the pressure units can be sequentially activated by a control unit. Thereby, the pressure units can mimic the pressure exerted by the fingers of a therapist on the tissue as well as the fingers' movement along the tissue. The plurality of individual pressure units inside the device according to the invention is, thus, able to mimic the complex massage patterns used by a human therapist e.g. during a manual massage session.

In a first aspect, the invention, hence, relates to a device for applying pressure to a body part of a subject, wherein the device comprises a plurality of pressure units and each pressure unit comprises a support structure and a movable member having three translational degrees of freedom relative to the support structure, wherein each pressure unit is connected or connectable to a control unit adapted to control the movement of the movable member relative to the support structure of the pressure unit. In a preferred embodiment, the device is a garment.

The device may be adapted to be worn around at least part of a body part, such as a limb. The device will, thus, have in preferred embodiments features of a garment. It is, specifically, wearable. This means that the device can stay on the body part to be treated without falling off—in particular when the wearer is moving, e.g. standing up—and without the need to actively hold the device during the treatment. For this purpose, the garment can either have an initial form that allows it to stay on the body part—such as a sleeve-, stocking-, trouser-, shirt-, glove- or helmet-like shape, i.e. a form that wraps around one or more body parts—or it can have an initial form that can be fitted around the body part to be treated—such as a wrap or sheet. Devices which have a form that can be fitted around the body part will have closure means which allow fasting of the device once it is fitted around the body part.

The device may be adapted to be worn around one or more limbs, e.g. selected from the group consisting of arms, legs, head, torso, hands, feet, fingers and/or toes. Preferred devices of the invention are adapted to be worn around an arm or a leg.

The device may e.g. be a sleeve—such as a tubular sleeve adapted for insertion of a body part into the sleeve—or a sleeve-like device which is adapted to surround an arm or part of an arm, such as the forearm. The device can also be a stocking or stocking-like garment which surrounds the leg or part of the leg, such as the lower leg. Further, the device may be adapted to fit around the head and/or neck of the wearer. The device can alternatively be a glove or glove-like device. For patients which have more than one extremity that is affected and requires treatment, the device can also cover more than one extremity and e.g. have a trouser-like shape.

The device can also be a sheet (wrap), preferably a sheet with closure means which can be wrapped around the body part and closed using the closure means. In one embodiment, the device is a sheet with closure means. The sheet can be adapted to be wrapped around one or more body part. These types of sheets can be termed compression wraps. The sheet may have a regular shape, such as a rectangular or square shape, or a more complex shape which supports wrapping of the sheet around one or more body parts. The sheet may, for example have two distinct but connected areas which are each adapted to be wrapped around a leg. Together the two areas can form a trouser-like shape when wrapped around the legs of a wearer.

Suitable closure means for a sheet are known in the art and include zippers, buttons, buckles, laces, velcro, hook-and-loop-closures and other suitable tightening mechanisms. It will be understood that it is advantageous if the wearer of the device can don the device himself or herself. Therefore, in some cases, e.g. when the device is to be worn on one hand or arm, the closure means is closable with a single hand, such as a zipper.

The device of the invention can be a mobile device, e.g. for use by a wearer at home or in changing locations, or a stationary device, e.g. for use in a hospital or other medical setting or for permanent use at a specific location at the home of a wearer.

The person who wears the device is called the "wearer" or "subject" herein. He or she may be a patient that is in need of acute or regular treatment, such as a person having lymphedema, or a person who uses the device preventively. Because the device is easy to use once it is programmed with the desired programme, the subject can use it conveniently at home without the need for a presence of a physician or massage therapist.

The device is adapted to apply pressure to one or more body parts of the subject, e.g. a leg, arm, head or other body part. The pressure exerted by the device is, firstly, an "active"—i.e. controllable and modifiable—pressure. This active pressure is exerted by the movable members within the pressure units of the device. The magnitude and location of the active pressure on the body part can be modified and controlled by changing the position of the movable member in x-, y- and/or z-direction. The device can, secondly, in particular embodiments, additionally exert a "passive" pressure on the body part, e.g. through the use of fastening mechanisms known in the art or particular compression fabrics. The passive pressure will usually not change considerably during the wearing of the device. However, it should be noted that an active movement of the moveable member, e.g. away from the body part, may influence the passive pressure, e.g. by pulling a part of the compression material away from the body part or by changes in muscle tension.

By exerting pressure on the body part, the body part is compressed, i.e. compression of the body part is caused. The extent to which the body part is compressed is sufficient to compress certain vessels and/or the tissue area around certain vessels, in particular lymph vessels and/or blood vessels. As a consequence, lymph fluid enters the lymph vessels from the surrounding tissue and/or lymph fluid is pressed through the lymph vessels in proximal direction—e.g. out of the limb into the centre of the body.

To be able to mimic a manual hand massage by a human therapist, the device of the invention comprises a plurality of pressure units, i.e. two or more pressure units. Each pressure unit can preferably independently exert pressure on the body part to be treated and perform stroking movements on the body part. The device can, e.g. comprise 2, 3, 4, 6, 7, 8, 9, or 10 pressure units. It is, however, preferred that the device comprises a larger number of pressure units, such as 10 or more, 20 or more, 30 or more, 40 or more, 50 or more, 60 or more, 70 or more, 80 or more, 90 or more, or 100 or more, 200 or more, 300 or more, 400 or more, 500 or more pressure units. The device can, e.g. comprise 30 or more pressure units. In another embodiment, the device comprises 50 or more pressure units. In other words, the device can, e.g. comprise from 10 to 500 pressure units, from 20 to 500, from 50 to 500, from 100 to 500. In particular examples, the device is adapted to fit on and/or wrap around a leg and comprises 300 to 500 pressure units, such as 350 to 450, preferably about 400. In another example, the device is adapted to fit on and/or wrap around an arm and comprises 200 to 400 pressure units, such as 250 to 350, preferably about 300. It will be understood that these numbers can be increased considerably when the size of the individual pressure units is decreased. The device can therefore also comprise from 100 to 2000 pressure units, from 200 to 1000, or similar.

Each pressure unit can have a size (i.e. cover an area of the body part) of e.g. 10 $cm^2$ or less, preferably 8 $cm^2$ or less, or most preferably 5 $cm^2$ or less. In other words, the pressure unit can have a size or from 10 $cm^2$ to 0.5 $cm^2$, 9 $cm^2$ to 0.5 $cm^2$, 8 $cm^2$ to 0.5 $cm^2$, 7 $cm^2$ to 0.5 $cm^2$, 6 $cm^2$ to 0.5 $cm^2$, 5 $cm^2$ to 0.5 $cm^2$, or 4 $cm^2$ to 0.5 $cm^2$. In a pressure unit with a square shape, the pressure unit can, e.g. have sides with a length of 2 cm each (in x- and y-direction), thus, resulting in an overall size in the XY plane of 4 $cm^2$.

Accordingly, the device may comprise 10 or more pressure units/$dm^2$, 15 or more pressure units/$dm^2$, 20 or more pressure units/$dm^2$, or 25 or more pressure units/$dm^2$, e.g. 25 pressure units/$dm^2$. In other words, the device may comprise e.g. from 10 to 50 pressure units/$dm^2$, from 15 to 40 pressure units/$dm^2$, or from 20 to 30 pressure units/$dm^2$.

The plurality of pressure units is preferably arranged in a two-dimensional array. This means that the pressure units are not arranged on top of each other, i.e. not in a manner that their individual movable members would come into contact with each other, but in a layer of pressure units.

The pressure units may form columns and rows of pressure units, e.g. in a checkerboard-like manner, or may be arranged in an irregular manner. Within the array the pressure units can, for example, be arranged in a regular or staggered (offset) configuration. For example, in a staggered configuration, the pressure units in one row or column can be laterally staggered with regard to the pressure units in another row or column, respectively, e.g. with regard to the or both adjacent rows or columns, respectively. Alternatively, in a regular configuration, the pressure units in the rows may be arranged in a regular manner, i.e. in line (not staggered) with the pressure units in the adjacent row, rows or rows and columns. It will be understood that the device can comprise a mixture of the aforementioned configurations, i.e. it may comprise areas in which the pressure units are arranged in a regular manner and other areas in which the pressure units are arranged in an irregular manner. Nevertheless, devices in which all pressure units are either arranged in a regular manner or in an irregular manner are also within the scope of the invention. In some embodiments, the device comprises pressure units that are arranged in an irregular, in particular staggered, configuration over the entire device or in at least 50% of the pressure units, preferably at least 70%.

The device can comprise one or more arrays of pressure units. The term "array" refers to a group of pressure units which is controllable by the same control unit. This means that a device which comprises a number of W arrays will also comprise at least W control units. Each array may be physically separated from the next array by a distance that exceeds the usual distance between the pressure units. The pressure units within an array can be as close together as possible. This means that they can be adjoining to each other, so that e.g. the support structures of neighbouring pressure units touch each other. However, to allow for more flexibility of the device, it is also possible to provide for some space between the pressure units.

Within the device, the pressure units can be arranged in a single pressure unit layer. The pressure unit layer will usually be positioned in the device in such a manner that the pressure unit layer is substantially parallel to the surface of the body part to be treated. It will be understood that, in consequence, the pressure unit layer does not have to be a flat layer. It can be shaped or be shapeable around the surface of the body part on which the device is to be worn. Thus, in one embodiment, the pressure units can be arranged in a pressure unit layer between the inner surface and the outer surface of the device.

The pressure units and, accordingly, the pressure unit layer can be arranged between the inner side and the outer side of the device. The device can comprise one, two or more layers of fabric, e.g. non-woven, woven, knitted or warp-knitted fabric. One of the layers can be on (i.e. form) the body-facing side of the device, i.e. the "inner" side of the device, and/or one on (i.e. form) the side of the device that is facing away from the body part to be treated, i.e. the "outer" side of the device. Accordingly, the pressure units can be arranged between two or more layers of fabric. This has the advantage that the fabric can feel better on the body part than the harder pressure unit material. Moreover, further components, such as wires, may be hidden between the two layers of fabric. Nevertheless, it is also possible that the pressure unit, e.g. the movable member, can come in direct contact with the body part to be treated, e.g. in direct contact with the skin. This would be an embodiment in which the device could comprise fabric layer(s) only on the side of the pressure units which faces away from the body part to be treated. These embodiments can be used directly on the body part or a separate, additional garment can be donned by the wearer before the device of the invention is donned.

The fabric layer(s) and the pressure units may be attached to each other, e.g. by stitching, encapsulation, lamination, bonding or the like. The device may comprise additional layers of fabric or other beneficial layers, such as a padding layer that increases the comfort of wearing the device.

The fabrics and padding materials used for these layers may be materials known for use in compression garments. The skilled person is able to identify suitable materials and manufacturing processes for producing suitable fabrics and padding materials. Such fabrics and padding materials are also available on the market. Usually, the fabrics will provide for some elasticity of the device to improve the wearing comfort.

Within an array of pressure units or the pressure unit layer, there will usually be no overlap between adjacent pressure units. This ensures that the movable members of the pressure units will all have substantially the same distance relative to the surface of the body part to be treated in their default position and that the movable members cannot interfere with each other's movements. Each moveable member has the same or similar access to the surface of the body part to be treated. The lack of an overlap between the pressure units also prevents the movable members or other components of the pressure units from mechanically interfering with each other's function.

The pressure units may be connected with each other and/or to the fabric layer(s) as described elsewhere herein. Preferably, the pressure units are connected to at least one, preferably all surrounding, i.e. adjacent, pressure units. The connection is preferably a flexible connection. The flexible connection enables the pressure units to be moved with respect to each other and, thus, adapt to the body part to be treated. The connection between adjacent pressure units can e.g. be one or more hinges. The one or more hinges connecting two adjacent pressure units are preferably connecting the support structures of these pressure units.

Each pressure unit comprises a support structure and a movable member having three translational degrees of freedom relative to the support structure.

The support structure as well as the movable members will usually consist of or comprise a material that is sufficiently hard to exert the required massage pressure. Suitable materials can be selected from the group consisting of metal, plastic, glass, ceramics and combinations thereof. Suitable materials are known in the art. A suitable plastic material is e.g. a 3D-printable material, such as Acrylonitrile-Butadiene-Styrene (ABS plastic), polylactic acid (PLA), polyvinylalcohol (PVA), Nylon, high-density polyethylene (HDPE), polyethylene terephthalate (PET), PETG; a plastic matrix comprising a filler material and/or reinforcements selected from the group consisting of wood filaments, sandstone, ceramics, metal filaments, or carbon fiber mix; or extrusion- or injection-molded plastics, such as acrylonitrile butadiene styrene (ABS), polyethylene, polycarbonate, polyamide, high impact polystyrene (HIPS), and polypropylene. The material can be a composite material, optionally having metal reinforcements or carbon nanotube reinforcements. The reinforcements may be coated with the respective plastic material or the reinforcements may be fillers used in the respective plastic materials.

The pressure unit's support structure is rigidly fixed within the device and adapted to hold the movable member and limit its range of motion. The support structure may act as a carrier for the movable member. The movable member is connected to this support structure preferably only by the actuators described herein. Additionally, the support structure can be the means via which the pressure unit can be fastened within the device and/or attached to one or more other pressure units. In one embodiment, the pressure units are, hence, secured in the device by means of the support structure. The support structure may alternatively form a part of another component of the device, such as a fabric layer.

The support structure can form or be a frame or frame-like structure. The frame or frame-like structure can surround or partially surround, respectively, the movable member or parts of the movable member on four sides of the movable member in the XY-plane of its pressure unit. The XY plane is substantially parallel to the body part to be treated. An embodiment in which only parts of the movable members could be surrounded would be an embodiment comprising a movable member having a stamp-like structure (described elsewhere herein) in which the broader foot section is located outside (below) the frame or frame-like structure (on the body part facing side of the support structure) and the narrower section is located within the frame or frame-like structure.

The XY-planes of each pressure unit are planes which are parallel to the surface of the body part to be treated when the device is worn. Accordingly, the XY-planes will also be parallel to the surface of the device which faces the body part to be treated and/or parallel to the surface of the device which faces away from the body part to be treated.

A 'frame' is a structure that surrounds the movable member continuously from all four sides in the XY-plane of its pressure unit, i.e. the movable member is in an opening within the structure. The frame may be substantially square-shaped with four sides of equal length or two pairs of sides with different lengths. Alternatively, the frame may substantially have the shape of a hexagon, i.e. a rhombus, rectangular shape, hexagonal shape; circular or ellipsoid shape. Hexagonal shaped pressure units have the advantages that they can be arranged well in the device, e.g. in a staggered manner.

A 'frame-like structure' surrounds the movable member partially on the four or more sides of the movable member in XY-planes. The frame-like structure could, thus, consist of or comprise four pieces, each of which is arranged within the pressure unit on another one of four sides of the movable member within the XY-plane. The four pieces can each be arranged substantially in the middle of the respective side of the pressure unit.

The support structure can be substantially flat or, alternatively, be slightly curved to fit to the body part to be treated. The curvature of the support structure can be substantially the same as the body part to be treated.

The frame or frame-like structure is adapted to leave sufficient room for movement for the movable member in the x- and y-directions, i.e. in or parallel to XY-plane. "Movement in x-direction" and "movement in y-direction" refer to movement in or parallel to an XY-plane. A movement in x-direction would be orthogonal to the movement in y-direction. Preferably, a movement in x-direction is movement along an X-axis that is parallel to at least one side of the frame or frame-like structure. Preferably, a movement in y-direction is movement along a Y-axis that is parallel to at least one side of the frame or frame-like structure. X-axis and Y-axis are orthogonal with respect each other. Evidently, there are two opposite ways to move in an 'x-direction', i.e. along or parallel to an X-axis, and two opposite ways to move in an 'y-direction', i.e. along or parallel to a Y-axis. Unless otherwise indicated herein movement in x-direction or in y-direction refers to the ability to move in both opposite directions along or parallel to the X-axis or the Y-axis, respectively.

To leave sufficient space for the movable member to be moved and also to be attached to the frame or frame-like structure, the frame or frame-like structure will usually—and in line with the common understanding of the term frame—have an opening in its middle. The opening can have four sides, e.g. have a substantially square-like shape. Alternatively, the opening can have more than four sides, e.g. a substantially hexagonal, octagonal or even round shape. Opening as well as frame or frame-like structure can, of course, have rounded edges to improve the wearing comfort of the device. Opening and frame or frame-like structure can have the same shape.

The movable member can have various shapes, such as a cylindrical, cubic or rubber stamp-like shape. Embodiments having the rubber stamp-like shape will have a broader foot section and a narrower head section. The foot section is adapted to be the section closest to the body part to be treated and will have a broader diameter in the XY-planes than the head section. The head section can have a pin-like or cylindrical shape. The foot section can have a flat surface at the end of the movable member that faces the body part to be treated—or the surface can be spherical, can be concave or convex, preferably concave. These shapes may aid in a realistic simulation of the shape of the fingers of the therapist. It is preferred that the movable member has rounded edges at least on the side of the body part to be treated to increase the comfort for the wearer.

In a moveable member that has a rubber stamp-like shape, the foot section can be considerably broader in x- and y-direction than the head section as mentioned above. Thereby, the areas of the body part which are not covered with a massaging entity are minimized. The foot section may, e.g. have a diameter in x- and y-direction that is 50% or more of the diameter of the opening in x- and y-direction, respectively, 60% or more, 70% or more, 80% or more, 90% or more, or 100% or more.

The movable member is configured to move within the support structure, such as within the frame or frame-like structure. It can be moved, in particular in x- and y-direction within an—particularly in z-direction—beyond the opening in the middle of the frame or frame-like structure. To ensure an unrestricted movement in x- and y-direction in particular in embodiments which have a rubber stamp-like shaped moveable member with a large foot section, parts of the movable member (such as the foot section) can be located outside the opening, i.e. not within the frame or frame-like structure. The foot section of the moveable member will then be located on the side of the frame or frame-like structure that faces the body part to be treated when the device is worn.

The movable member can, further, be moved in z-direction, i.e. orthogonal to the XY-plane. While the movement in x- and y-direction is predominantly relevant for stroking movements which mimic the stroking of a massaging finger along the surface of the body part—the movement in the z-direction is predominantly decisive for the level of (active) pressure that the movable member exerts on the body part. The movable member is, hence, at least able to move from its default position in z-direction towards the body part. In certain embodiments, it can also be beneficial to enable the movable member to be moved from its default position in z-direction away from the body part. Thereby, the pressure in specific areas can be momentarily reduced.

The "default position" of the movable member is the position which the movable member assumes within the support member when the control unit does not provide any input signals to it, i.e. the actuators described elsewhere herein are not provided with a stimulus. In the default position, the movable member will usually be substantially in the middle of the support structure, e.g. substantially in the middle of the frame or frame-like structure, especially in the XY planes, potentially also in the XZ and/or XY planes.

As the movable member is movable in x-, y- and z-direction within the support structure, it has three translational degrees of freedom relative to the support structure, i.e. it can independently move in three directions, namely in x-, y- and z-direction. It will be understood that the movements in the three directions can be fluidly combined so that the movable member can also move diagonally relative to all of the aforementioned directions.

The movable member of each pressure unit can be movable at least 5 cm, 4 cm, 3 cm, 2 cm, 1 cm, 0.75 cm, 0.5 cm, 0.25 cm or 0.1 cm, preferably at least 0.25 cm, relative to its respective support structure in at least one direction, preferably in two or more directions, more preferably in three directions. In other words, the movable member of each pressure unit can be movable from 0.1 to 5 cm, preferably 0.25 to 2 cm relative to its respective support structure in at least one direction, preferably in two or more directions, more preferably in three directions.

It will be understood that longer stroking actions can be achieved through a combination of movements of movable members of more than one pressure unit. Stroking movements of 25 cm or more length can be mimicked with several adjacent pressure units. Thus, preferably an array of pressure units will be able to simulate a stroking, linear massage movement having a length of at least 15 cm, preferably at least 20 cm or 25 cm.

The movement of the movable member can be advantageously effected by actuator elements. These will usually be coupled to the support structure and to the movable member of the respective pressure unit. Each pressure unit can comprise one or more actuator elements, preferably at least two. Each actuator element is adapted to facilitate movement of the movable member in a certain direction with regard to the support structure. In other words, the pressure unit can comprise one or more, preferably three or more, such as 5 or 6, actuator elements that are configured to move the movable member of that pressure unit in one to three dimensions relative to the support structure of that pressure unit. For example, the pressure unit can comprise one or two actuator elements that are configured to move the movable member of that pressure unit in one dimension (movement along one axis) relative to the support structure of that pressure unit. The pressure unit can comprise two, three or four actuator elements that are configured to move the movable member of that pressure unit in two dimensions (movement along two axes, wherein the first axis of movement is orthogonal to the second axis of movement) relative to the support structure of that pressure unit. The pressure unit can comprise three to six actuator elements that are configured to move the movable member of that pressure unit in three dimensions (movement along three axes, wherein each axis of movement is orthogonal to the other two axes of movement) relative to the support structure of that pressure unit. The movement of the movable member is caused by a change in the shape and/or the length of the actuator element(s).

In a second aspect, the invention relates, hence, to a pressure unit comprising (i) a support structure; (ii) a movable member having three translational degrees of freedom relative to the support structure; and (iii) one or more, preferably two or more, actuator elements each coupled to the support structure and the movable member, the pressure unit being connected or connectable to a control unit adapted to control the movement of the movable member relative to the support structure.

In a related aspect, the invention relates to a pressure unit comprising (i) a support structure; (ii) a movable member; and (iii) one or more, preferably two or more, actuator elements each coupled to the support structure and the movable member, wherein the support structure of the pressure unit is a frame or frame-like structure and the movable member is configured to move within the frame or frame-like structure, and the pressure unit is connected or connectable to a control unit adapted to control the movement of the movable member relative to the support structure.

To facilitate movement of the movable member in one or more directions, the pressure unit can comprise 1 or more, 2 or more, 3 or more, 4 or more, 5 or more, or 6 or more actuator elements. In one embodiment, the pressure unit comprises 2 actuators, such as 2 actuators effecting movement in z-direction(s). In another embodiment, the pressure unit comprises 6 actuators.

A preferred device of the invention has an inner surface adapted to be arranged towards the body part, and an opposite, outer surface, defining a z-direction represented by the inner-to-outer direction and in an x- and y-direction, being mutually perpendicular directions and both orthogonal to the z-direction, wherein the one or more actuator elements of a pressure unit are configured to move the movable member of that pressure unit in the x, y and z-directions.

As mentioned above, the movement of the movable member can be effected by a change in length, shape and/or a rotation of the actuator element(s). Accordingly, the pressure unit(s) can comprise one or more actuator elements that undergo a change in length along an axis of expansion, shape and/or rotate, in response to a stimulus, thereby moving the movable member. In other words, the pressure units are configured to apply compression to or remove compression from the body part based on the presence or absence of an applied stimulus. The change of the actuator element pushes or pulls the movable member in a certain direction. A combination of changes in more than one actuator element can enhance the push/pull in a certain direction—e.g. when one actuator pushes in an x-direction and another pulls in the opposite direction along the same X-axis—and/or lead to a diagonal movement. Alternatively, the actuators may act antagonistically—as described in more detail elsewhere herein—so that either both push or both pull along the same X-axis in opposite direction. In this embodiment, a first actuator can pull the movable member from its default position and its antagonist can pull it back into its original, default position. The actuator elements will, accordingly, be activated sequentially.

In another embodiment, that requires only a single actuator (in toto or for one direction)—but can contain more—, a mechanical spring may provide antagonistic movement. For example, one actuator may be adapted to push the movable member in z-direction towards the surface of the body part to be treated and a spring also comprised in the pressure unit, and preferably connecting the support structure and the movable member, pulls or pushes the movable member back to its default position in the absence of a stimulus applied to the actuator element.

A further embodiment that requires only one—but can contain more—actuator is an actuator that is rotating in response to a certain stimulus and has a particular shape that will cause the movable member to move in different directions depending on the extent of rotation. An example of such an actuator element would be an element that has three wings, each on another plane.

The stimulus used to effect the change in the actuator element can be selected from the group consisting of an electrical signal, temperature change, a chemical stimulus and combinations thereof. However, it is preferred that the stimulus is an electrical stimulus. Application of the stimulus to the actuator moves the movable member of the respective pressure unit.

The one or more actuator elements of a pressure unit can for example comprise, or consist of, one or more shape memory materials, such as a shape memory alloy (SMA) or a shape memory polymer (SMP), such as a two-way SMP, such as IPN (interpenetrating polymer network) and LCE (liquid crystal elastomers). Alternatively, the one or more actuator elements of a pressure unit can comprise or consist of coiled filaments, carbon nanotube (CNT) actuators, electroactive polymers, or artificial muscles. Artificial muscles include PAM (pneumatic artificial muscles), dielectric elastomers and the like.

In some embodiments, the one or more actuator elements of a pressure unit comprise, or consist of, one or more SMAs. SMAs are specific metal alloys which exhibit a shape memory effect, which is the ability of a material to restore its original shape when stimulated after deformation. This means that they return to a certain "pre-programmed" or "remembered" state when they are exposed to a particular stimulus, e.g. an electrical stimulus, a magnetic stimulus or a heat stimulus. Suitable SMAs are known in the art and are available on the market (e.g. Flexinol®, Dynalloy, USA). Precise heat treatment of specific alloys can cause the shape memory effect. The SMA can be selected from the group consisting of alloys of nickel and titanium, such as Nitinol; alloys of silver and cadmium; alloys of copper and tin; alloys of iron, manganese and silicon; and mixtures thereof. Nitinol is a well-known SMA material and particularly preferred (Mirvakili and Hunter, *Artificial Muscles: Mechanisms, Applications, and Challenges*. Advanced Materials, 2018. 30(6): p. 1704-1707; Costanza et al., *Nitinol One-Way Shape Memory Springs: Thermomechanical Characterization And Actuator Design*. Sensors and Actuators A: Physical, 2010. 157(1): p. 113-117.) Nitinol is a stoichiometrically equal nickel-titanium alloy that can exhibit super elastic or shape memory properties at room temperature, depending on the heat treatment used. The required heating of the SMA can be achieved by application of a suitable electrical stimulus to the actuator element.

In other embodiments, the one or more actuator elements of a pressure unit comprise, or consist of, one or more SMPs. SMPs are a class of stimuli-responsive materials, where the polymers respond to an applied external stimulus such as heat, light, pH, electric or magnetic field, etc. Shape memory polymers can deform to an applied external stimulus (such as heat) and memorize shape(s) temporarily. SMPs can be classified as one-way, two-way and multiple shape memory polymers based on number of shape that they can memorize or number of transformations that they can make.

One-way shape memory polymers present generally single shape transformation. When one-way SMPs are deformed using a physical force at greater than its transition temperature ($T_{trans}$), and cooled down while holding that shape, they remember and retain their deformed shape. They recover their original shape when exposed to a thermal stimulus ($>T_{trans}$). Thus, with one-way SMPs, only one shape transformation occurs inherently by the material. Two-way shape memory polymers present two shape transformations. They can remember two shapes and show transformations at two different transition temperatures ($T_{trans}$). Thus, a two-way SMPs can e.g. behave like an actuator wherein at one $T_{trans}$, the shape can change to a temporary one and return to original shape at another $T_{trans}$. In preferred embodiments, the SMP is, thus, a two-way SMP. Multiple shape memory show multiple shape transformation at multiple different transition temperatures.

Shape memory effect can be found in a variety of polymers including amorphous polymer, semi-crystalline polymer and liquid crystalline polymer. Shape memory effect can be found in thermoplastic and thermoset polymers, and they can be of physical or chemical crosslinks. Typical examples of polymers which can present shape memory effect include segmented polyurethanes, and blends of polyurethane and polyvinylchloride, polycaprolactone based copolymers, polyethylene glycol based copolymers, polystyrene, polycarbonate, poly(ether ether ketone) (PEEK), polyaramids, ethylene-vinyl acetate (EVA), polytetrafluoroethylene (PTFE), poly(methyl methacrylate), etc. Suitable examples are known in the art. The SMP may be a homopolymer or a co-polymer comprising hard segments and soft segments having different thermal transitions.

The actuator elements or parts thereof can have the shape of a wire, sheet, rod, tube, spring or coil. For example, the actuators or parts thereof can have the shape of a spring, such as a wave spring or portion thereof, wire or a ribbon, in particular a flat ribbon. In some embodiments, the actuator elements are in the shape of a wire or coil. The actuator can be in a strained state when it is connected to the support structure and the movable element. Application of heat or heat-causing electricity as a stimulus will cause the shape change or rotation of the actuator, e.g. the contraction, straightening from a bent or curved condition or bending or curving from a straight conformation; thus, creating translational movement.

The actuator element can e.g. have a diameter or thickness of from 0.1 to 10 mm, preferably from 0.25 to 5 mm.

The actuator elements in a pressure unit can be arranged opposite from each other to be able to complement each other's movement in a certain direction. In one embodiment two actuator elements of a pressure unit can be configured to act as an antagonistic pair of actuator elements. The first actuator element of the antagonistic pair is configured to move the movable member of that pressure unit in a first direction relative to the support structure, the second actuator element of the antagonistic pair is configured to move the movable member of that pressure unit in a second direction relative to the support structure, and the first and second directions are opposite directions. The first and second direction may, for example, be opposite directions along the same X-axis (i.e. opposite x-directions), opposite directions along the same Y-axis (i.e. opposite y-directions) or, preferably, opposite directions along the same Z-axis (i.e. opposite z-directions).

To be able to mimic a manual massage technique even more realistically, it is preferred that the movable member is not only movable with one degree of freedom, such as in one or both z-directions, but with more than one, preferably as described above in x-, y- and z-directions. Accordingly, the pressure unit can comprise at least two, preferably three, antagonistic pairs of actuator elements that are configured to move the movable member of that pressure unit in mutually orthogonal directions relative to the support structure. In a similar embodiment, the pressure unit comprises two antagonistic pairs of actuator elements that are configured to move the movable member of that pressure unit in x- and y-directions and a further, fifth, actuator element that is configured to move the movable member of that pressure unit in z-directions.

It has been found in the context of the invention that movement in z-direction to exert the pressure on the body part is particularly advantageous if the responsible actuator spans from one side of the support structure over—i.e. on the side of the movable member that faces away from the body part to be treated—the movable member to the other side of the support structure. Contraction of the actuator will in this way press the movable member downwards in the direction of the surface of the body part to be treated. An antagonistic actuator can span from one side of the support structure below—i.e. on the side of the movable member that faces the body part to be treated—the movable member to the other side of the support structure.

Accordingly, in one embodiment of the invention, the pressure unit comprises at least one actuator element that spans from a start point on one side of the frame or frame-like structure to an endpoint on an opposite side of the frame or frame-like structure, and a middle portion of said actuator element is adjacent to the surface of the movable member of that pressure unit; and wherein said actuator element is configured to move the movable member in z-directions (up and down) relative to the support structure in response to a stimulus changing their length along an axis of expansion of the actuator or their shape. Start point and endpoint can be approximately in the middle of their respective sides of the support structure. Start point and endpoint are on opposite sides of the support structure in x- or in y-direction. The middle portion of the actuator element is adjacent to the movable member and, thereby, able to push the movable member up or down in z-direction. Accordingly, there will be direct or indirect contact between the surface of the movable member and the actuator. The actuator may be directly adjacent, i.e. lying on the movable member or passing through an opening on the movable member, or there may be another element, e.g. to fasten the actuator on the movable member, in between. It may also be possible to physically or chemically fuse the actuator to the movable member. In one embodiment, the moveable member has a rubber stamp-like shape and an actuator element responsible for movement of the moveable member in z-direction (away from the body part to be treated) passes through an opening in the movable member that is located near or at the location where the head and foot section of the moveable member meet.

The actuator elements can be at least partially coated with an electrically isolating layer, such as a layer comprising or consisting of silicone. Suitable materials for electrically isolating layers are known in the art and include silicone, plastic materials and combinations thereof.

The level of pressure that can be exerted by the pressure unit onto the body part is comparable to the pressure applied by a finger during a manual massage session. Suitable comparative pressure measurements can, e.g. be performed with the Pliance X system with pressure sensor type S2073 (Novel GmbH).

The pressure unit is able to exert pressure on the body part for at least 30 min, preferably 45 min. During this time, the pressure unit can exert pressure constantly or sporadically, depending on the massage algorithm used.

Preferably, each of the pressure units is adapted to apply a controllable pressure to the body part on which the device comprising the pressure units is worn. For this purpose, each pressure unit is connected or connectable to a control unit adapted to control the movement of the movable member relative to the support structure of the pressure unit. The control unit is suitable for controlling the one or more actuator elements according to a set of parameters and is, preferably, a programmable control unit. The control unit can comprise, or be connected or connectible to, a power source.

The control unit can be a computer or similar device that can be programmed with a particular massage programme and can in turn trigger the corresponding stimuli for the pressure units. The programme will specify the magnitude of pressure (movement of movable member in z-direction) as well as the stroking movements that shall be carried out by the array of pressure units and translate these to suitable input signals for the pressure units. The stroking movements are effected by controlling the movement of the movable members of particular pressure units in x- and y-directions as well as by controlling which pressure units shall be active (i.e. moving their movable members) at which time.

Accordingly, the various pressure units within an array or device are independently controllable. In a preferred embodiment, the movement of the movable member of a first pressure unit is, in other words, controllable independently of the movement of the movable member of a second, adjacent pressure unit. This applies, preferably, to all or substantially all pressure units within the array or device, i.e. preferably, the movements of the movable member of each pressure unit are controllable independently of the movement of the movable members of its adjacent pressure units.

The device of the invention may further comprise one or more sensors configured to measure physiological data and/or device performance data, e.g. pressure sensors, temperature sensors, motions sensors, or others. The sensors can be used to provide a feedback regarding the device's performance (device performance data) and/or the subjects response to the treatment (physiological data). The feedback can be used by the programme to modify or stop the applied massage treatment.

In a third aspect, the present invention relates to an ex vivo method of preparing (i.e. making ready, setting up) a device according to the invention, comprising providing the control unit with a series of instructions representing a movement pattern and/or instructions for a level of pressure to be exerted by the movable member or the length of movement in z-direction for each of the pressure units. Further preparation steps used in this ex vivo method may include e.g. steps of cleaning or assembling the device.

In a fourth aspect, the present invention relates to a method for applying pressure to a body part of a patient, the method comprising: fastening a device according to the invention to the body part, applying compression therapy by using the movable member in one or more pressure units, a) to exert pressure on the body part and, optionally, subsequently alleviate the pressure and/or b) to provide a stroking movement on the body part; wherein the pressure units are independently controlled according to a predetermined compression therapy sequence; optionally, measuring physiological data and/or device performance data; and optionally, modulating the compression therapy sequence for controlling the one or more pressure units based on the measured physiological data and/or device performance data.

It is particularly preferred that the method, pressure unit or device described herein is for use in the treatment of a disease or condition selected from the group consisting of tired legs, varicose veins, venous ulcers, lymphedema and the like. Accordingly, the patient or wearer may be a person suffering from one of the aforementioned conditions, in particular a patient suffering from lymphedema.

The application of compression therapy in the method of the invention and, in particular, the exertion of pressure under step a) and the implementation of stroking movement under step b) is preferably controlled by a control unit mentioned elsewhere herein. The control unit and the corresponding power source provide the corresponding stimuli to the pressure units.

While it may occasionally be desired to apply compression therapy with only one or a few pressure units comprised in the device described herein, it is usually desired to implement a more complex massage sequence using a plurality of pressure units, such as or more, 20 or more, 30 or more, 40 or more, or 50 or more.

The use of sensors in the device as described elsewhere herein allows for an interactive massage therapy session. Monitoring of the device performance and/or the patient's physical responses to the treatment improves the therapy and allows for an adaptation of the therapy whenever desirable.

In a fifth aspect, the invention relates to a device, such as the device described herein, preferably for providing compression therapy to a body part of a subject, comprising two or more pressure units as defined herein.

The device can be a garment as described elsewhere herein or another structure that is adapted to fit partially or completely around or on a body part. For example, the device can be a massaging device that can be brought into contact with a body part and which comprises one or more pressure units or an array of pressure units. The device can e.g. be a hand-held massaging device. The term "garment" includes sheets and other forms of garments such as stockings and the like as described elsewhere herein.

The device can, in principle, have all properties described herein above. For example, within the device, movement of the movable member of a first pressure unit is controllable independently of the movement of the movable member of a second, adjacent pressure unit. The device will usually be configured to apply and/or remove compression from the body part based on the presence or absence of an applied stimulus.

BRIEF DESCRIPTION OF FIGURES

Exemplary embodiments of the invention are shown schematically in the drawings.

These and other aspects of the invention will be apparent from and elucidated with reference to the embodiments described hereinafter.

DESCRIPTION OF EMBODIMENTS

Additional advantages, characteristics, and features of the present invention will become clear from the following detailed description of exemplary embodiments with reference to the attached drawings. However, the invention is not restricted to these exemplary embodiments.

Figure 1A:
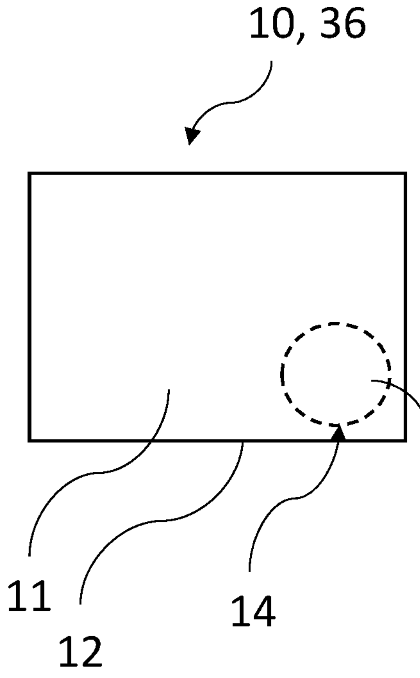
FIG. 1 schematically shows a sheet-like device forming a sleeve according to an embodiment of the invention in open (A) and closed (B) configuration.
Figure 1B:
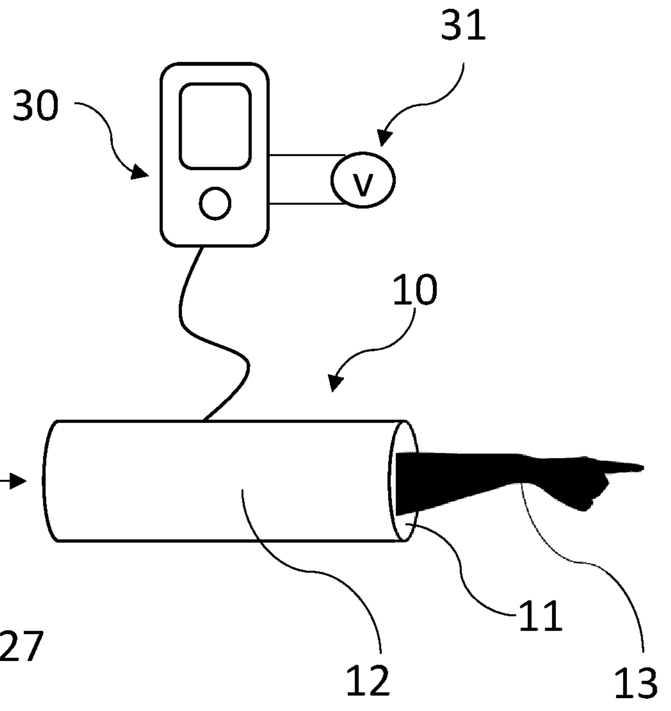

FIG. 1 schematically shows a device 10 according to the invention. The device 10 has the form of a sheet 36 that can be closed into a sleeve-like conformation around a body part 13 of a patient, e.g. around an arm of the patient as shown in FIG. 1B. FIG. 1A shows the sheet 36 in its open state and FIG. 1B shows the sheet 36 in its closed state.

The sheet 36 has a dedicated inner surface 11 that is adjacent to the surface of the body part 13 of the wearer when it is attached to the body part 13 and a dedicated outer surface 12 that is on the outside of the sleeve 36 when the sleeve 36 is attached to the body part 13. The inner surface 11 was formed by a low friction compression sleeve between the body part and the pressure unit.

The sheet 36 is attached to a control unit 30 that can control the movement of the movable members 21 within the sheet 36 (not shown in this figure). The control unit 30 is in this embodiment a portable computer, such as a mobile phone, that can conveniently be used by the patient himself in varying locations. The control unit 30 is adapted to independently control the movement of all movable members 21 within the sheet 36 in x-, y-, and z-direction with respect to their respective support structures 25 (not shown). For this purpose, the control unit 30 is connected to a power source 31, such as a portable battery or rechargeable battery, that provides the control unit 30 with electrical energy. The power source 31 can also supply electrical energy to the pressure units 20 within the device 10. Alternatively, a second, separate power source for the pressure units 20 may be included in the device 10.

Figure 2:
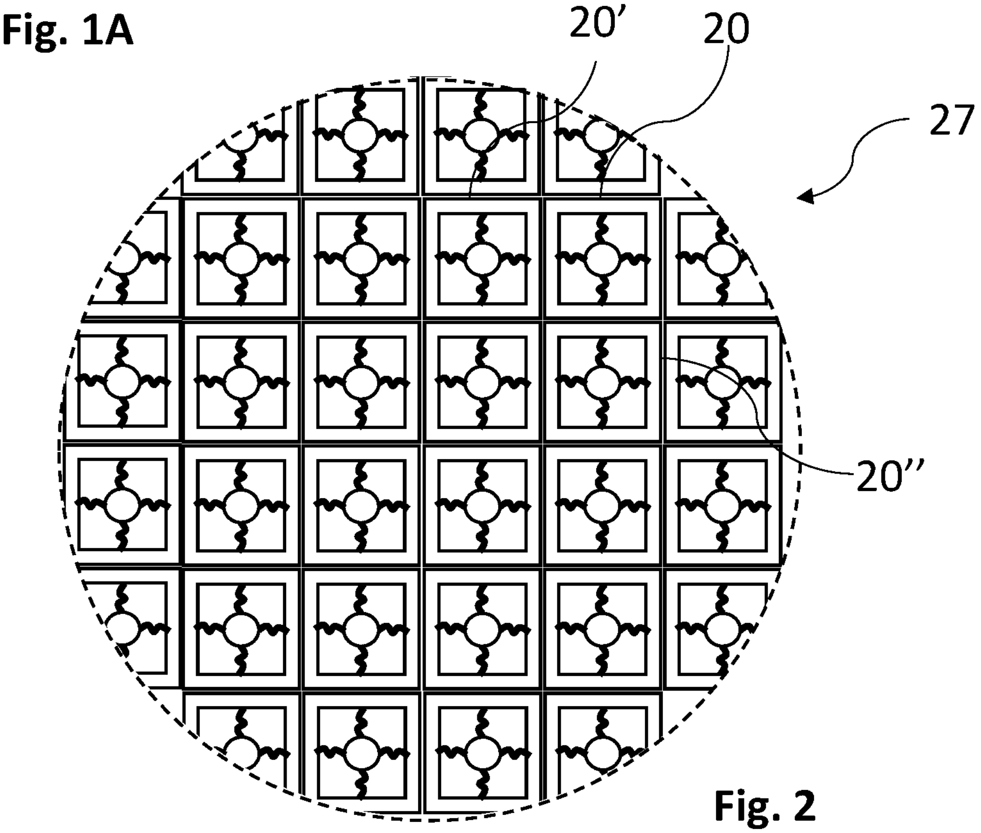
FIG. 2 schematically shows a detail of FIG. 1*a*, i.e. an array of pressure units according to an embodiment of the invention.

The pressure units 20, 20', 20" of the device 10 are schematically shown in more detail in FIG. 2. The figure shows an enlarged section 14 from FIG. 1*a*. FIG. 2 displays an array 27 of pressure units 20, 20', 20" comprising four rows and four lines of regularly, non-staggered pressure units 20, 20', 20". The sheet 36 comprises further pressure units 20 which are not shown here.

Figure 3:
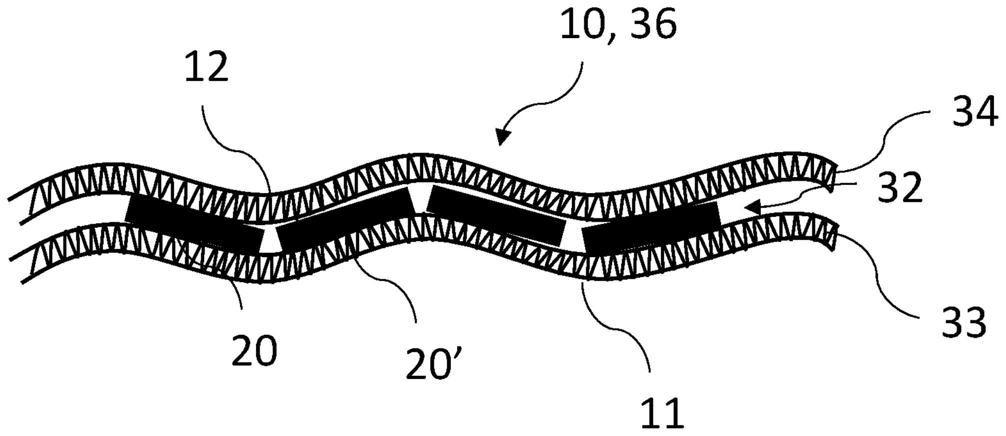
FIG. 3 schematically shows a cross section of a device according to the invention wherein a pressure unit layer is disposed between two layers of fabric.

FIG. 3 schematically shows a cross section of a device 10 according to the invention wherein a pressure unit layer 32 is disposed between two layers of fabric 33, 34. The device is a sheet 36 like the one shown in FIG. 1. The layers of fabric 33, 34 each consist of a thick, double-knitted fabric that provides protection and attachment for the pressure unit layer 32 and increases the wearing comfort for the patient who wears the device 10. The device 10 comprises a pre-determined outer surface 12 and inner surface 11 which can be adapted to their respective purposes. For example, the inner surface 11 can comprise fabric that is suitable to transport fluids away from the skin. The outer surface may be particularly durable, i.e. have a high resistance to mechanical stress.

Between the two layers of fabric 33, 34 a pressure unit layer 32 is provided that can comprise one or more arrays 27 of pressure units 20 such as the one shown in FIG. 2. The pressure unit layer 32 and/or individual pressure units 20, 20', 20" can be connected to one or both fabric layers 33, 34. For example, the pressure units 20, 20', 20" can be sewn into the device 10, i.e. be connected to one or both fabric layers 33, 34 via suitable yarn. Alternatively, the pressure unit layer 32 and/or individual pressure units 20, 20', 20" can be glued onto one or both fabric layers 33, 34, directly or via a connecting element. The connection between pressure units 20, 20', 20" and fabric layers 33, 34 stabilizes the device 10 and prevents the pressure units 20, 20', 20" from slipping between the fabric layers 33, 34.

FIG. 4 schematically shows a pressure unit 20 according to an embodiment of the invention in a top view (A) and a side view (B). It can be seen that the pressure unit 20 comprises a support structure 25 which has the form of a square-shaped frame. The frame has a large square-shaped opening 29 in its middle that provides enough space for the movable member 21 to move in. The length of each side of the opening 29 equals more than 50% of the length of each side of the support structure 25. The support structure 25 consists of rigid plastic, such as ABS (acrylonitrile-butadiene-styrene) or PLA (poly(lactic acid)). To electrically isolate the support structure 25 and/or improve the comfort for the patient, it may be coated with an electrically isolating layer, such as a silicone layer.

The pressure unit 20 additionally comprises a movable member 21 that is adapted to move in three directions, i.e. x-, y- and z-direction, relative to the support structure 25. The movable member 21 consists of rigid plastic, such as ABS (acrylonitrile-butadiene-styrene) or PLA (poly(lactic acid)). To electrically isolate the movable member 21 and/or improve the comfort for the patient, it may be coated with an electrically isolating layer, such as a silicone layer.

The movable member 21 has a cylindrical shape. One end of the cylinder points towards the surface of the body part 13 to be treated. The movable member 21 is connected and attached to the support structure 25 via actuator elements 22, 22', 23, 23' visible in FIG. 4A as well as actuator element 24 which can be seen in FIG. 4B.

Figure 4A:
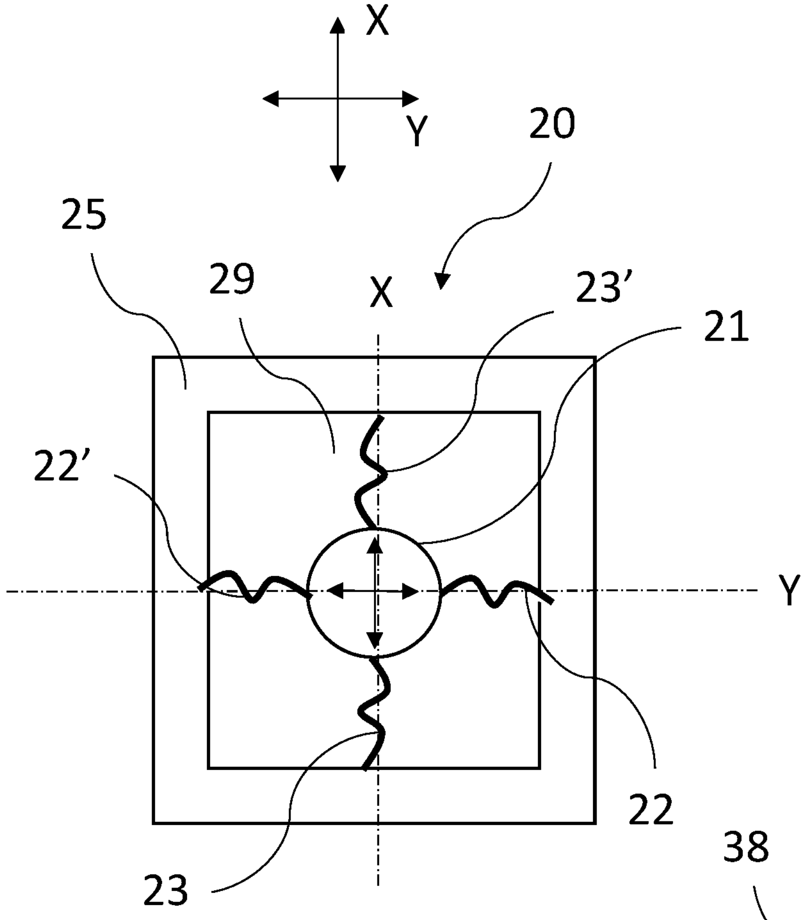
FIG. 4 schematically shows a pressure unit according to an embodiment of the invention in a top view (A) and a side view (B)

FIG. 4A schematically illustrates that the actuator elements 22, 22', 23, 23' are adapted to move the movable member 21 in an XY-plane. The XY-plane is parallel to the inner surface 11 of the device 10 and the surface of the body part 13 to be treated. The actuator elements 22, 22', 23, 23' form a first pair of antagonistically acting actuator elements 22, 22' and a second pair of antagonistically acting actuator elements 23, 23''. The actuator elements 22, 22', 23, 23' which act antagonistically are moving the movable member 21 in opposite directions. For example, the first pair of antagonistically acting actuator elements 22, 22' is able to move the movable member 21 in two opposing directions along the Y-axis, in a first y-direction and a second y-direction, respectively. The second pair of antagonistically acting actuator elements 23, 23' are able to move the movable member 21 in two opposing directions along the X-axis, in a first x-direction and a second x-direction, respectively.

Figure 4B:
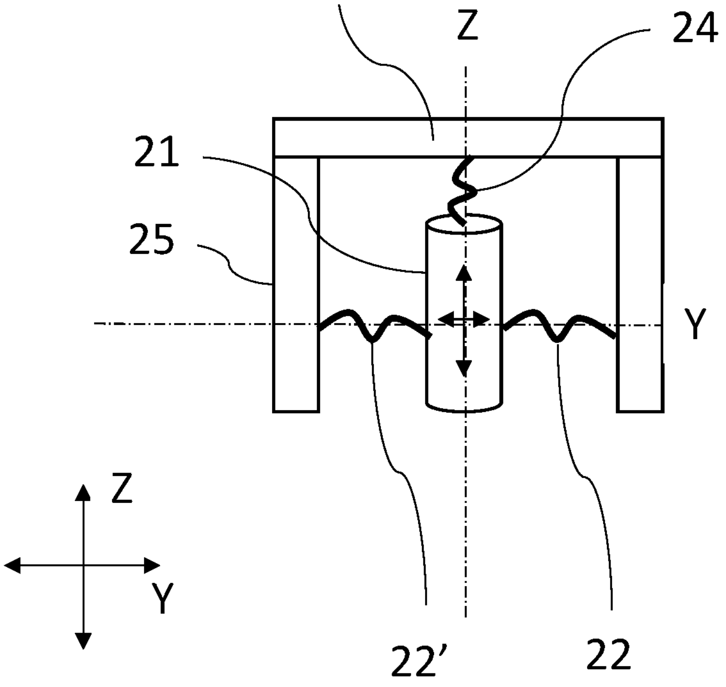

FIG. 4B schematically illustrates that the actuator element 24 is adapted to move the movable member 21 in an z-direction, i.e. in the direction of the body part to be treated or away from the body part to be treated, i.e. upwards in the FIG. 4B shown. FIG. 4B shows an arrangement where the contraction of the actuator element 24 comprising SMA reduces pressure applied to the body part. The pressure is restored when the actuator element 24 is de-activated. Thereby the pressure applied to the body part is varied. In other words, the actuator element 24 is able to pull the movable member 21 away from the body part 13 to be treated and, thus, alleviate pressure from the body part 13.

It can be seen in FIG. 4B that the support structure 25 can also comprise a roof element 38 that is attached to or part of the frame or frame-like structure which surrounds the movable member 21. The roof element 38 is, in the embodiment shown here, used for attachment of the actuator element 24 which is responsible for movement of the movable member 21 in a z-direction. The actuator element 24 is fastened substantially in the middle of the roof element 38.

The actuator elements 22, 22', 23, 23', 24 in the embodiment described herein are made from the SMA Nitinol. Applying an electric current to the one or more of the actuator elements 22, 22', 23, 23', 24 will cause the respective actuator element 22, 22', 23, 23', 24 to change shape and, accordingly, move the movable member 21 in the direction of the respective actuator element 22, 22', 23, 23', 24.

The control unit 30 (not shown) controlling to which actuator elements 22, 22', 23, 23', 24 an electric current is applied, controls each of the actuator elements 22, 22', 23, 23', 24 individually. More than one actuator element 22, 22', 23, 23', 24 of a pressure unit 20 can be subjected to application of an electric current at the same time. Thereby, the movable member 21 can be moved freely—also diagonally—through the space arranged for the movable member 21 in the pressure unit 20. In this way, stroking and pressing movements can be combined.

The actuator elements 22, 22', 23, 23', 24 are each fastened approximately in the middle of their respective side of the support structure 25. This ensures that there is sufficient room for the movable member 21 to move in all directions. Of course, it would also be possible to place the actuator elements 22, 22', 23, 23', 24 in a biased manner more to one side or edge of the support structure 25.

Figure 5A:
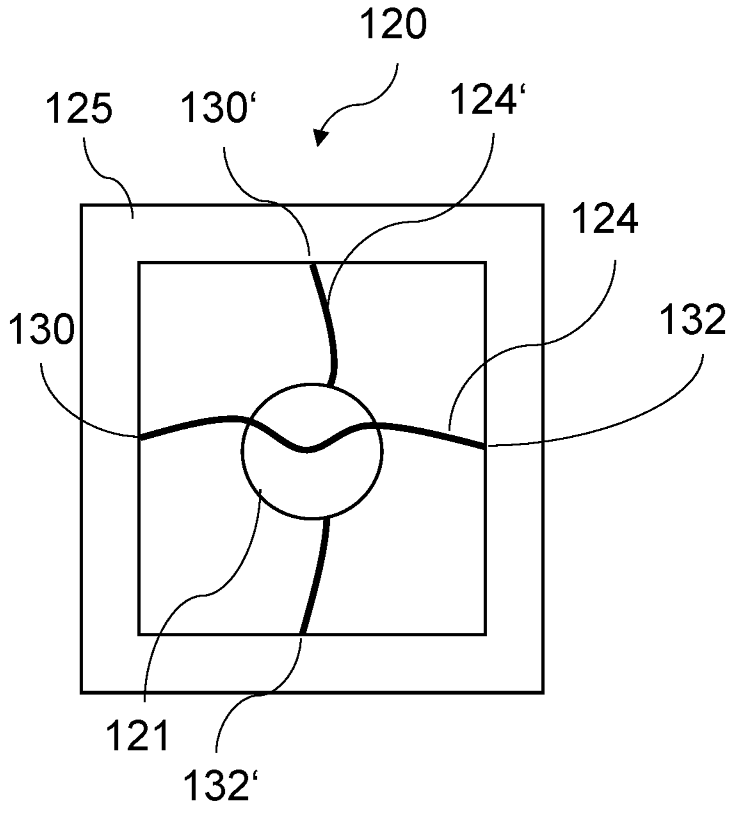
FIG. 5 schematically shows a pressure unit according to another embodiment of the invention in a top view (A) and a side view (B)
Figure 5B:
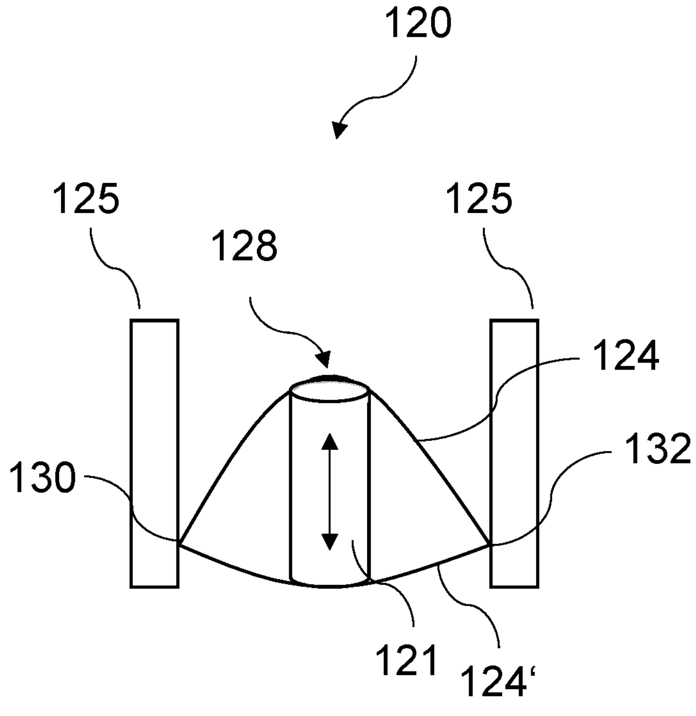

FIG. 5 schematically shows a pressure unit 120 according to another embodiment of the invention in a top view (A) and a side view (B). The actuator elements 22, 22', 23, 23' adapted to move the movable member 121 in x- and y-directions are not shown in this figure. They can be implemented into the pressure unit 120 as described above for other embodiments.

The pressure unit 120 comprises a support structure 125 that is silicone-coated metal. The support structure 125 has the shape of a frame and no roof element. Two lengthy actuator elements 124, 124' are fastened to the support structure 125. Both span from the frame structure on one side of the support structure 125 to the frame structure on the opposing side of the support structure 125. Thereby, the actuator elements 124, 124' cross the location of the movable member 121 either on its body-facing side (124) or on the opposite side (124'). Contraction of one of the actuator elements 124, 124' will, hence, lead to a movement in one of the z-directions because the respective actuator element 124, 124' will reduce its length, thereby straighten slightly and press its middle portion 128 onto the movable member 121.

The actuator element 124 is fastened to the frame in a start point 130 on one side of the support structure 125 and with its other end fastened to an endpoint 132 on the opposing side of the support structure 125. The actuator element 124' is fastened to the frame in a start point 130' on one side of the support structure 125 and with its other end fastened to an endpoint 132' on the opposing side of the support structure 125. The actuator elements 124, 124' are orthogonal with respect to each other. Start points 130, 130' and endpoints 132, 132' are each approximately in the middle of the respective side of the support structure 125 in x- and y-directions. In z-directions, the start points 130, 130' and endpoints 132, 132' may also be approximately in the middle of the frame; however, in the embodiment shown, the points are slightly moved towards the body-facing side of the device, i.e. they are located between the body facing side and the middle of the frame in z-direction. Thereby, more pressure can be exerted onto the body part 13 to be treated.

To allow for unrestricted movement in the x- and y-directions, the movable member 121 can have a channel (groove) shaped recess on one or both of its ends (not shown). The 'ends' of the moveable member 121 are the ends in z-directions. The recess will extend in the same direction as the actuator element 124, 124' for which it is intended so that the respective actuator element 124, 124' can glide through the recess when the movable member 121 moves in an x- or y-direction. The actuator element 124, 124' rests or glides through the recess with the element's middle portion 128. At the same time, the recess also prevents slipping of the actuator elements 124, 124' from the movable member 121 and, thus, stabilizes the contact between the actuator element(s) 124, 124' and the movable member 121.

Figure 6:
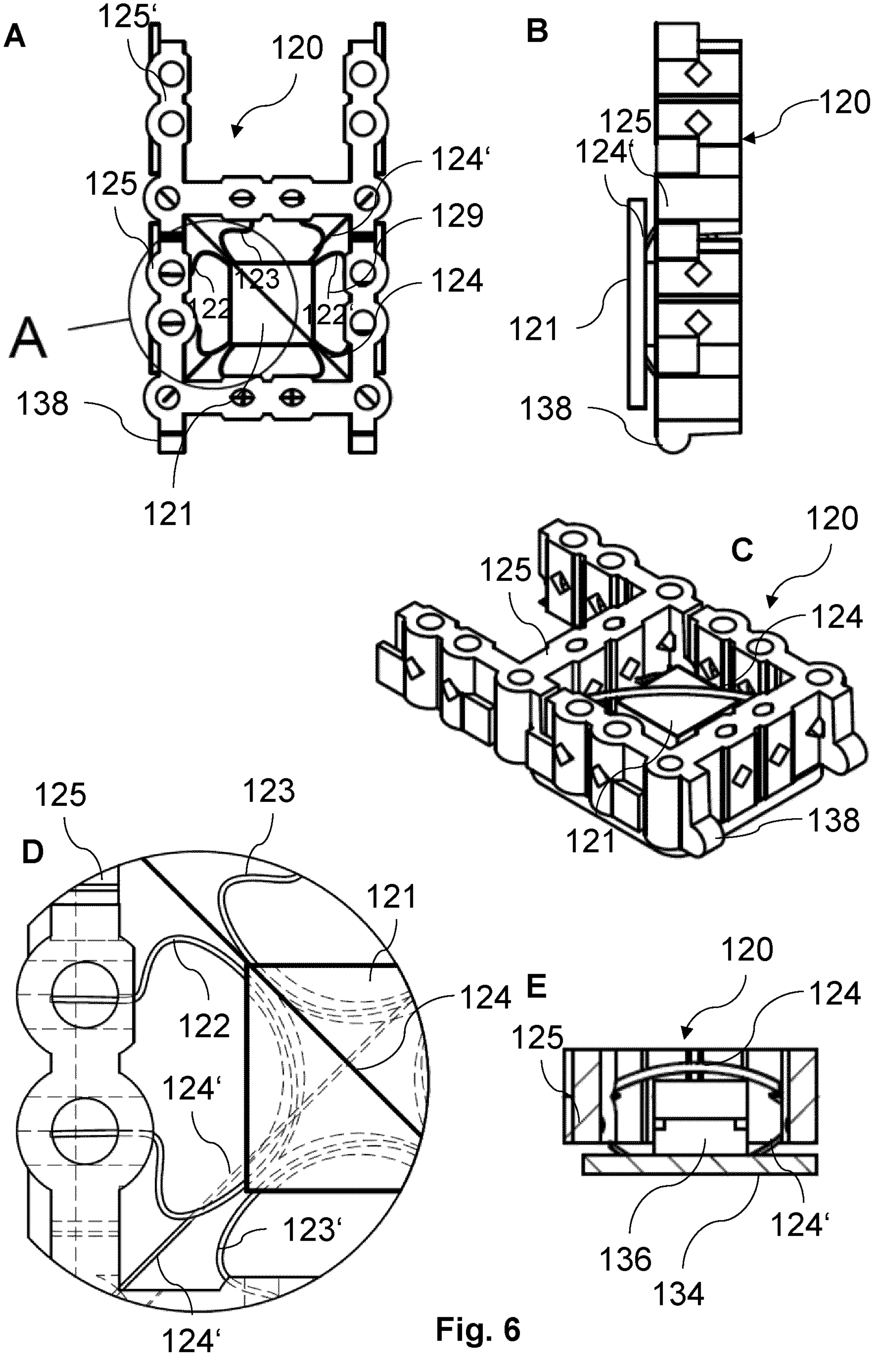
FIG. 6 schematically shows a pressure unit according to an embodiment of the invention in a top view (A), two side views (B, E), perspective view (C) and an excerpt of part A (D)

FIG. 6 schematically shows a pressure unit 120 according to an embodiment of the invention in a top view (A), two side views (B, E), a perspective view (C) and an excerpt of part A (D). The pressure unit 120 comprises a support structure 125 having an opening 129 with a square shape. Together with a part of the support structure 125' of the adjacent pressure unit 120 (for which only part of the frame is shown), the support structure 125 forms a square frame around the opening 129 in which the movable member 121 can be moved by actuator elements 124, 124', 122, 122', 123, 123' (see FIGS. 6A and 6D).

The actuator elements 122, 122', 123, 123' which are responsible for a movement of the movable member 121 in the x- and y-direction have the form of a loop and consist of the SMA Nitinol. Both ends of each loop are connected to the support structure 125 on the same side. Application of an electrical stimulus to these actuator elements 122, 122', 123, 123' leads to a change in the shape of the loop pushing the movable member 121 away from the position in which the respective actuator element is fastened to the support structure. The middle of each actuator element 122, 122', 123, 123' is located in a tunnel in the head section 136 of the rubber stamp-shaped movable member 121.

The actuator elements 124, 124' which are responsible for a movement of the movable member 121 in the z-direction have a curved form and consist of the SMA Nitinol. One of these actuator elements 124 is curved from the support structure 125 at one corner of the opening 129 over the head section 136 of the movable member 121 to the support structure 125 at the opposite corner of the opening 129 (third corner). "over" in this context means at the side that is facing away from the body part when the device is worn. The other one of these actuator elements 124' is curved from the support structure 125 at a second corner of the opening 129 through a channel in the foot section 134 of the movable member 121 to the support structure 125 at the opposite corner of the opening 129 (fourth corner). Application of an electrical stimulus to one of these actuator elements 124, 124' leads to a change in shape of the respective actuator element 124, 124' pushing the movable member 121 towards the other actuator element 124', 124 (compare FIGS. 6A, 6C and 6E).

The movable member 121 has a rubber stamp like shape with a wider foot section 134 and a narrower head section 136 (see FIG. 6E). In the embodiment shown, the foot section 134 has a diameter and area in the XY planes which is larger than the diameter and area which is covered in the same planes by the opening 129. This ensures that pressure can be exerted by the movable member 121 onto a relatively large area of the body part. At the same time, the head section 136 of the movable member 121 has a narrow cylindrical shape which ensures that the movable member 121 can be moved in all directions to a sufficient extent.

The support structures 125 and 125' are connected to each other with a connection system comprising a hinge 138 (see FIGS. 6B and 6C). The same connection is used to connect the support structures 125, 125' to further support structures of other pressure units 120. The hinge system ensures that the connected pressure units can flexibly adapt to the surface of the body part to be treated.

Figure 7:
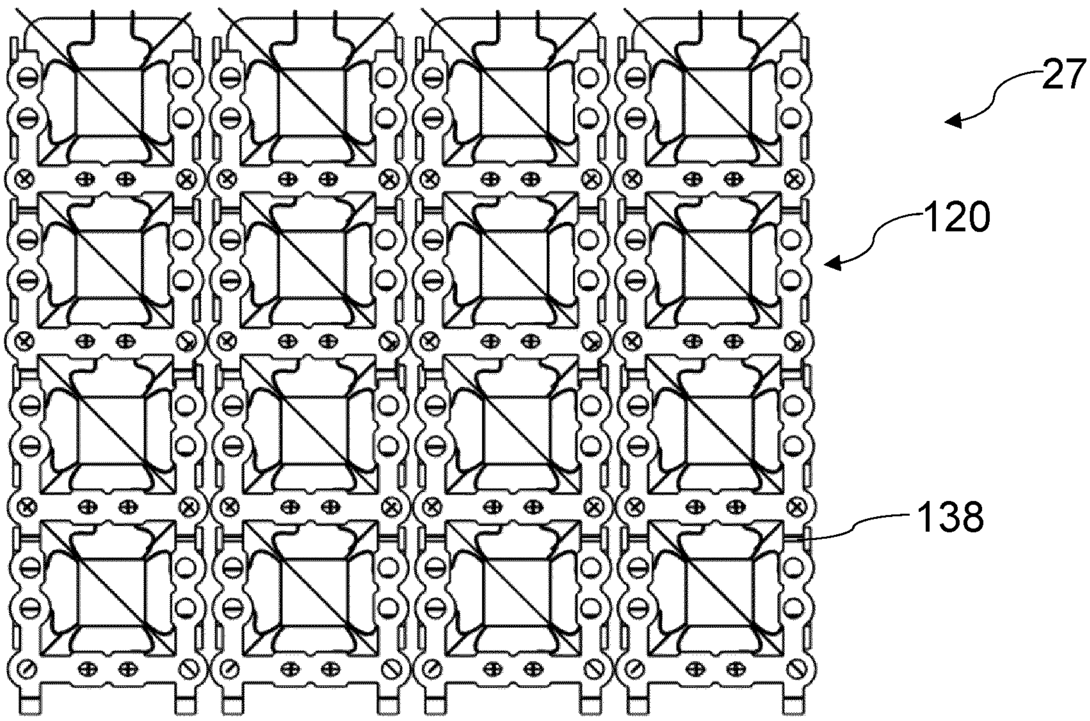
FIG. 7 schematically shows an array of pressure units according to the embodiment shown in FIG. 6.

FIG. 7 schematically shows an array 27 of pressure units 120. The pressure units 120 are identical to those described above and shown in FIG. 6. It can be seen that pressure units 120 within a column are connected with the connection system using a hinge 138 described above and shown in detail in FIGS. 6B and 6C. A similar connection system can also be used to connect the pressure units in rows. In addition or alternatively, the pressure units 120 can be connected to tissue layers (not shown) comprised in the device of the invention.

Figure 8:
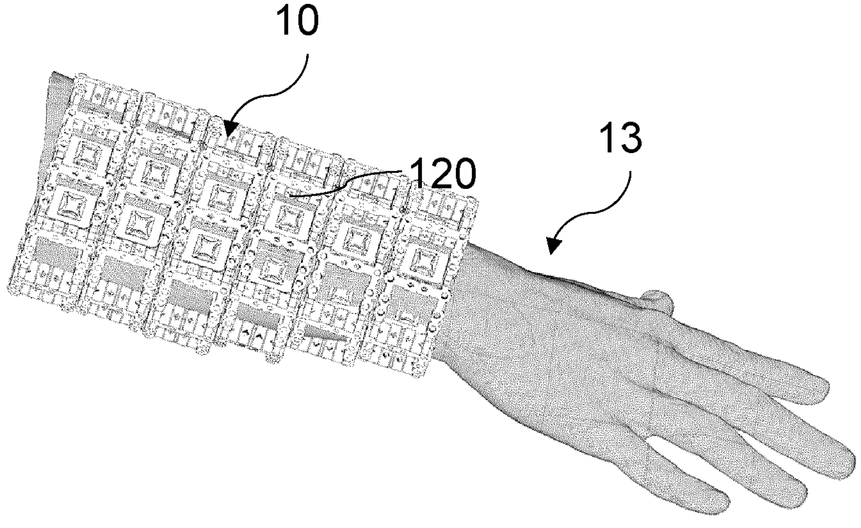
FIG. 8 shows a wearable device comprising an array of FIG. 7.

FIG. 8 shows a wearable device 10 of the invention comprising an array 27 of pressure units 120 as described above and shown in FIGS. 6 and 7. The wearable device has a sleeve-like form. A body part 13 (an arm) of a wearer is slid into the sleeve. It can be seen that the hinges 138 used for connection of the pressure units 120 allows the device to bend around the body part 13 in a flexible manner.

Although the present invention has been described in detail with reference to the exemplary embodiments, it is obvious to those skilled in the art that the invention is not restricted to these exemplary embodiments, but rather that modifications can be made in such a way that individual features are omitted or other combinations of the individual features presented are realized, provided that the scope of protection of the appended claims is not exceeded. The present disclosure includes any and all combinations of the individual features presented.

The invention claimed is:

1. A wearable device for applying pressure to a body part of a subject, comprising:
   a plurality of pressure units,
   wherein each pressure unit of the pressure units comprises:
      a support structure being a frame,
      a movable structure movably supported by the support structure and having three translational degrees of freedom relative to the support structure, and
      three or more actuator elements configured to suspend the movable structure relative to the frame, wherein the moveable structure and the three or more actuator elements are positioned inside the frame,
   wherein each pressure unit of the pressure units is connected or connectable to a controller configured to control the three or more actuator elements to move the movable structure in the three translational degrees of freedom relative to the support structure.

2. The device according to claim 1,
   wherein the pressure units are configured to apply compression to or remove compression from the body part based on a presence or absence of an applied stimulus,
   wherein the pressure units comprise first and second units adjacent to each other, and
   wherein a movement of the movable structure of the first pressure unit is controllable independently of a movement of the movable structure of the second pressure unit.

3. The device according to claim 1, comprising 20 or more of the pressure units.

4. The device according to claim 1,
   wherein one of the three or more actuator elements undergoes a change in length along an axis of expansion in response to a stimulus, the stimulus being one or more of an electrical signal, temperature change, a chemical stimulus to move the movable structure.

5. The device according to claim 1, wherein the three or more actuator elements comprises a shape memory material.

6. The device according to claim 1, wherein the three or more actuator elements comprise first and second actuator elements configured to act as an antagonistic pair, wherein the first actuator element is configured to move the movable structure in a first direction relative to the support structure, wherein the second actuator element is configured to move the movable structure in a second direction relative to the support structure, and wherein the first and second directions are opposite directions.

7. The device according to claim 1, wherein the device is a tubular sleeve adapted for insertion of the body part into the tubular sleeve, a sheet with a closure fastener configured to be closed around the body part, a stocking, or a glove.

8. A method of preparing the device according to claim 1, comprising providing the controller with a series of instructions representing a movement pattern for each pressure unit of the pressure units.

9. The device according to claim 1, wherein each pressure unit of the pressure units defines an X-axis, a Y-axis orthogonal to the X-axis, and a Z-axis orthogonal to the X-axis and the Y-axis, wherein the frame including a first side wall and a second side wall opposite each other along the X-axis, and a third side wall and a fourth side wall opposite each other along the Y-axis, wherein the movable structure of each pressure unit of the pressure units is disposed within a space defined by the first, second, third, and fourth side walls, wherein the three or more actuator elements of each pressure unit of the pressure units comprise a first actuator element, a second actuator element, a third actuator element, and a fourth actuator element, and wherein the movable structure of each pressure unit of the pressure units is coupled to the first side wall via the first actuator element, coupled to the second side wall via the second actuator element, coupled to the third side wall via the third actuator, coupled to the fourth side wall via the fourth actuator element.

10. The device of claim 9, wherein the frame further comprises an upper wall disposed above the first, second, third, and fourth side walls along the Z-axis, and wherein the movable structure is coupled to the upper wall via a fifth actuator element of the three or more actuator elements.

11. The device according to claim 10, wherein the movable structure is cylindrical.

12. The device according to claim 11, wherein the first, second, third and fourth actuator elements are coupled to a circumference of the movable structure, and the fifth actuator element is coupled to a flat end surface of the movable structure.

13. A pressure unit comprising:

a support structure;

a movable structure movably supported by the support structure and having three translational degrees of freedom relative to the support structure; and actuator elements, wherein each of the actuator elements is coupled to the support structure and the movable structure, wherein the pressure unit is connectable to a controller configured to control a movement of the movable structure relative to the support structure, wherein the pressure unit defines an X-axis, a Y-axis orthogonal to the X-axis, and a Z-axis orthogonal to the X-axis and the Y-axis, wherein the support structure is a frame including a first side wall and a second side wall opposite each other along the X-axis, and a third side wall and a fourth side wall opposite each other along the Y-axis, wherein the movable structure is disposed within a space defined by the first, second, third, and fourth side walls, wherein the actuator elements comprise first, second, third, and fourth actuator elements, wherein the movable structure is coupled to the first side wall via the first actuator element, coupled to the second side wall via the second actuator element, coupled to the third side wall via the third actuator element, coupled to the fourth side wall via the fourth actuator element, and wherein the pressure unit is configured to exert pressure on a body part.

14. The pressure unit according to claim 13, wherein the first, second, third, and fourth actuator elements are configured to move the movable structure in three dimensions relative to the support structure, and wherein the first, second, third, and fourth actuator elements comprise shape memory materials.

15. The pressure unit according to claim 13, wherein the first and second actuator elements are configured to act as an antagonistic pair, wherein the first actuator element is configured to move the movable structure in a first direction relative to the support structure, wherein the second actuator element is configured to move the movable structure in a second direction relative to the support structure, and wherein the first and second directions are opposite directions.

16. The pressure unit of claim 13, wherein the actuator elements further comprise a fifth actuator element, wherein the frame further comprises an upper wall disposed above the first, second, third, and fourth side walls along the Z-axis, and wherein the movable structure is coupled to the upper wall via the fifth actuator element.

17. A pressure unit comprising:

a support structure;

a movable structure movably supported by the support structure and having three translational degrees of freedom relative to the support structure; and actuator elements, each of the actuator elements coupled to the support structure and the movable structure, wherein the support structure of is a frame and the movable structure is configured to move within the frame, wherein the pressure unit is connected or connectable to a controller configured to control a movement of the movable structure relative to the support structure, wherein the pressure unit defines an X-axis, a Y-axis orthogonal to the X-axis, and a Z-axis orthogonal to the X-axis and the Y-axis, wherein the frame includes a first side wall and a second side wall opposite each other along the X-axis, and a third side wall and a fourth side wall opposite each other along the Y-axis, wherein the movable structure is disposed within a space defined by the first, second, third, and fourth side walls, wherein the actuator elements comprise first, second, third, and fourth actuator elements, wherein the movable structure is coupled to the first side wall via the first actuator element, coupled to the second side wall via the second actuator element, coupled to the third side wall via the third actuator element, coupled to the fourth side wall via the fourth actuator element, wherein the pressure unit is configured to exert pressure on a body part, wherein the movable structure is cylindrical.

18. A device comprising two or more of the pressure unit according to claim 17.

19. The pressure unit according to claim 17, wherein the first, second, third, and fourth actuator elements are configured to move the movable structure in three dimensions relative to the support structure, and wherein the first, second, third, and fourth actuator elements comprise shape memory materials.

20. The pressure unit according to claim 17, wherein the first and second actuator elements are configured to act as an antagonistic pair of actuator elements, wherein a first actuator element is configured to move the movable structure in a first direction relative to the support structure, wherein the second actuator element is configured to move the movable structure in a second direction relative to the support structure, and wherein the first and second directions are opposite directions.

21. The pressure unit of claim 17, wherein the actuator elements further comprise a fifth actuator element, wherein the frame further comprises an upper wall disposed above the first, second, third, and fourth side walls along the Z-axis, and wherein the movable structure is coupled to the upper wall via the fifth actuator element.

* * * * *